United States Patent
Schultz et al.

(10) Patent No.: US 8,573,066 B2
(45) Date of Patent: Nov. 5, 2013

(54) FLUIDIC OSCILLATOR FLOWMETER FOR USE WITH A SUBTERRANEAN WELL

(75) Inventors: Roger L. Schultz, Nannekah, OK (US); Robert L. Pipkin, Duncan, OK (US); Travis W. Cavender, Angleton, TX (US); Neal G. Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 206 days.

(21) Appl. No.: 13/213,259

(22) Filed: Aug. 19, 2011

(65) Prior Publication Data

US 2013/0042699 A1    Feb. 21, 2013

(51) Int. Cl.
*G01F 1/20*  (2006.01)

(52) U.S. Cl.
USPC ........................................ 73/861.19

(58) Field of Classification Search
USPC ................. 73/861.19, 861.61, 861.63, 54.02, 73/861.13, 861.75
See application file for complete search history.

(56) References Cited

U.S. PATENT DOCUMENTS

| | | | |
|---|---|---|---|
| 2,324,819 A | 6/1941 | Butzbach | |
| 3,091,393 A | 5/1963 | Sparrow | |
| 3,111,931 A | 11/1963 | Bodine | |
| 3,238,960 A | 3/1966 | Hatch, Jr. | |
| 3,244,189 A | 4/1966 | Bailey | |
| 3,247,861 A | 4/1966 | Bauer | |
| 3,397,713 A | 8/1968 | Warren | |
| 3,407,828 A | 10/1968 | Jones | |
| 3,444,879 A | 5/1969 | McLeod, Jr. | |
| 3,461,897 A | 8/1969 | Kwok | |
| 3,563,462 A | 2/1971 | Bauer | |
| 4,052,002 A | 10/1977 | Stouffer et al. | |
| 4,127,173 A | 11/1978 | Watkins et al. | |
| 4,151,955 A | 5/1979 | Stouffer | |
| 4,276,943 A | 7/1981 | Holmes | |
| 4,291,395 A | 9/1981 | Holmes | |
| 4,323,991 A | 4/1982 | Holmes et al. | |
| 4,385,875 A | 5/1983 | Kanazawa | |
| 4,418,721 A | 12/1983 | Holmes | |

(Continued)

FOREIGN PATENT DOCUMENTS

| | | |
|---|---|---|
| EP | 0304988 B1 | 11/1992 |
| WO | 2005093264 A1 | 10/2005 |

OTHER PUBLICATIONS

International Search Report with Written Opinion issued Apr. 12, 2012 for PCT Patent Application No. PCT/US11/053403, 17 pages.

(Continued)

*Primary Examiner* — Jewel V Thompson
(74) *Attorney, Agent, or Firm* — Smith IP Services, P.C.

(57) ABSTRACT

A fluidic oscillator can include a fluid switch, at least two fluid paths from the fluid switch, and a sensor which measures a frequency of fluctuations in flow through the fluidic oscillator. A method of measuring a flow rate of a fluid can include flowing the fluid through a fluidic oscillator, a majority of the fluid flowing alternately via at least two fluid paths from a fluid switch of the fluidic oscillator, and a sensor detecting a frequency of the flow alternating between the fluid paths. Another fluidic oscillator can include a fluid input, at least two fluid paths from the fluid input to respective fluid outputs, whereby a majority of fluid which flows through the fluidic oscillator flows alternately via the fluid paths, and a sensor which detects pressure fluctuations due to the flow alternating between the fluid paths.

38 Claims, 13 Drawing Sheets

(56) References Cited

U.S. PATENT DOCUMENTS

| | | | | |
|---|---|---|---|---|
| 4,550,614 | A | * | 11/1985 | Herzl .................... 73/861.19 |
| 4,838,091 | A | * | 6/1989 | Markland et al. ......... 73/861.19 |
| 4,919,204 | A | | 4/1990 | Baker et al. |
| 4,969,827 | A | | 11/1990 | Hahs, Jr. |
| 4,976,155 | A | * | 12/1990 | Challandes ............... 73/861.19 |
| 5,063,786 | A | * | 11/1991 | Sanderson et al. ......... 73/861.19 |
| 5,127,173 | A | * | 7/1992 | Thurston et al. ............. 73/202 |
| 5,184,678 | A | | 2/1993 | Pechkov et al. |
| 5,228,508 | A | | 7/1993 | Facteau et al. |
| 5,339,695 | A | * | 8/1994 | Kang et al. ................. 73/861.19 |
| 5,455,804 | A | | 10/1995 | Holmes et al. |
| 5,484,016 | A | | 1/1996 | Surjaatmadja et al. |
| 5,505,262 | A | | 4/1996 | Cobb |
| 5,533,571 | A | | 7/1996 | Surjaatmadja et al. |
| 5,827,976 | A | * | 10/1998 | Stouffer et al. ............. 73/861.19 |
| 5,919,327 | A | | 7/1999 | Smith |
| 5,947,183 | A | | 9/1999 | Schneider et al. |
| 6,233,746 | B1 | | 5/2001 | Skinner |
| 6,241,019 | B1 | | 6/2001 | Davidson et al. |
| 6,336,502 | B1 | | 1/2002 | Surjaatmadja et al. |
| 6,345,963 | B1 | | 2/2002 | Thomin et al. |
| 6,405,797 | B2 | | 6/2002 | Davidson et al. |
| 6,497,252 | B1 | | 12/2002 | Kohler et al. |
| 6,619,394 | B2 | | 9/2003 | Soliman et al. |
| 6,747,743 | B2 | | 6/2004 | Skinner et al. |
| 6,851,473 | B2 | | 2/2005 | Davidson |
| 6,913,079 | B2 | | 7/2005 | Tubel |
| 6,948,244 | B1 | | 9/2005 | Crockett |
| 6,976,507 | B1 | | 12/2005 | Webb et al. |
| 7,025,134 | B2 | | 4/2006 | Byrd et al. |
| 7,114,560 | B2 | | 10/2006 | Nguyen et al. |
| 7,159,468 | B2 | | 1/2007 | Skinner et al. |
| 7,213,650 | B2 | | 5/2007 | Lehman et al. |
| 7,213,681 | B2 | | 5/2007 | Birchak et al. |
| 7,216,738 | B2 | | 5/2007 | Birchak et al. |
| 7,318,471 | B2 | | 1/2008 | Rodney et al. |
| 7,404,416 | B2 | | 7/2008 | Schultz et al. |
| 7,404,441 | B2 | | 7/2008 | Hocking |
| 7,405,998 | B2 | | 7/2008 | Webb et al. |
| 7,413,010 | B2 | | 8/2008 | Blauch et al. |
| 7,511,823 | B2 | | 3/2009 | Schultz et al. |
| 2004/0011733 | A1 | | 1/2004 | Bjornsson |
| 2005/0214147 | A1 | | 9/2005 | Schultz et al. |
| 2006/0013427 | A1 | | 1/2006 | Workman et al. |
| 2006/0039749 | A1 | | 2/2006 | Gawehn |
| 2006/0104728 | A1 | | 5/2006 | Erickson et al. |
| 2006/0108442 | A1 | | 5/2006 | Russell et al. |
| 2007/0045038 | A1 | | 3/2007 | Han et al. |
| 2007/0256828 | A1 | | 11/2007 | Birchak et al. |
| 2008/0047718 | A1 | | 2/2008 | Orr et al. |
| 2008/0142219 | A1 | | 6/2008 | Steele et al. |
| 2009/0008088 | A1 | | 1/2009 | Schultz et al. |
| 2009/0008090 | A1 | | 1/2009 | Schultz et al. |
| 2009/0009297 | A1 | | 1/2009 | Shinohara et al. |
| 2009/0009333 | A1 | | 1/2009 | Bhogal et al. |
| 2009/0009336 | A1 | | 1/2009 | Ishikawa |
| 2009/0009412 | A1 | | 1/2009 | Warther |
| 2009/0009437 | A1 | | 1/2009 | Hwang et al. |
| 2009/0009445 | A1 | | 1/2009 | Lee |
| 2009/0009447 | A1 | | 1/2009 | Naka et al. |
| 2009/0032260 | A1 | | 2/2009 | Schultz et al. |
| 2009/0032267 | A1 | | 2/2009 | Cavender et al. |
| 2009/0065197 | A1 | | 3/2009 | Eslinger |
| 2009/0159282 | A1 | | 6/2009 | Webb et al. |
| 2009/0178801 | A1 | | 7/2009 | Nguyen et al. |
| 2009/0277639 | A1 | | 11/2009 | Schultz et al. |
| 2010/0252261 | A1 | | 10/2010 | Cavender et al. |
| 2011/0042092 | A1 | | 2/2011 | Fripp et al. |
| 2011/0186300 | A1 | | 8/2011 | Dykstra et al. |
| 2012/0167994 | A1 | | 7/2012 | Schultz et al. |
| 2012/0168013 | A1 | | 7/2012 | Schultz et al. |
| 2012/0168014 | A1 | | 7/2012 | Schultz et al. |
| 2012/0168015 | A1 | | 7/2012 | Schultz et al. |

OTHER PUBLICATIONS

Office Action issued Oct. 16, 2012 for U.S. Appl. No. 12/983,153, 37 pages.

U.S. Appl. No. 13/624,737, filed Sep. 21, 2012, 56 pages.

Office Action issued Aug. 14, 2012 for U.S. Appl. No. 12/983,145, 28 pages.

Office Action issued Sep. 10, 2012 for U.S. Appl. No. 12/792,095, 59 pages.

Specification and Drawings for U.S. Appl. No. 10/650,186, filed Aug. 28, 2003, 16 pages.

Apparatus and Method of Inducing Fluidic Oscillation in a Rotating Cleaning Nozzle, ip.com, dated Apr. 24, 2007, 3 pages.

OPTIMUX; "Fluidic Flowmeter: Sensor Technology", informational brochure, date received Aug. 10, 2011, 9 pages.

Office Action issued Feb. 1, 2013 for U.S. Appl. No. 13/624,737, 50 pages.

Office Action issued Feb. 21, 2013 for U.S. Appl. No. 12/792,095, 26 pages.

Lee Precision Micro Hydraulics, Lee Restrictor Selector product brochure; Jan. 2011, 9 pages.

Tesar, V.; Fluidic Valves for Variable-Configuration Gas Treatment; Chemical Engineering Research and Design journal; Sep. 2005; pp. 1111-1121, 83(A9); Trans IChemE; Rugby, Warwickshire, UK.

Tesar, V.; Sampling by Fluidics and Microfluidics; Acta Polytechnica; Feb. 2002; pp. 41-49; vol. 42; The University of Sheffield; Sheffield, UK.

Tesar, V., Konig, A., Macek, J., and Baumruk, P.; New Ways of Fluid Flow Control in Automobiles: Experience with Exhaust Gas Aftertreament Control; 2000 FISITA World Automotive Congress; Jun. 12-15, 2000; 8 pages; F2000H192; Seoul, Korea.

International Search Report and Written Opinion issued Mar. 25, 2011 for International Patent Application Serial No. PCT/US2010/044409, 9 pages.

International Search Report and Written Opinion issued Mar. 31, 2011 for International Patent Application Serial No. PCT/US2010/044421, 9 pages.

Office Action issued Jun. 26, 2011 for U.S. Appl. No. 12/791,993, 17 pages.

Halliburton Application and Drawings filed Jan. 11, 2011 with U.S. Appl. No. 13/004,135.

Office Action issued Mar. 14, 2013 for U.S. Appl. No. 12/983,145, 23 pages.

International Search Report and Written Opinion issued Feb. 28, 2013 for PCT Application No. PCT/US2012/050727, 12 pages.

Office Action issued Jun. 20, 2013 for U.S. Appl. No. 12/983,144, 60 pages.

Office Action issued Jul. 5, 2013 for U.S. Appl. No. 13/624,737, 19 pages.

International Search Report and Written Opinion issued May 2, 2013 for PCT Application No. PCT/GB2011/001758, 10 pages.

International Search Report and Written Opinion issued May 3, 2013 for PCT Application No. PCT/GB2011/001759, 10 pages.

Office Action issued Jun. 4, 2013 for U.S. Appl. No. 12/983,150, 48 pages.

Office Action issued May 8, 2013 for U.S. Appl. No. 12/792,095, 14 pages.

* cited by examiner

US 8,573,066 B2

FLUIDIC OSCILLATOR FLOWMETER FOR USE WITH A SUBTERRANEAN WELL

BACKGROUND

This disclosure relates generally to equipment utilized and operations performed in conjunction with a subterranean well and, in an example described below, more particularly provides a fluidic oscillator flowmeter.

There are many situations in which it would be desirable to measure a flow rate of fluid in a well. For example, in steam flooding operations or other stimulation operations, it would be desirable to measure the flow of steam or treatment fluid into a formation. In production operations, it would be desirable to measure the flow of fluid produced from the well. These are just a few examples of a wide variety of possible applications for a flowmeter.

Therefore, it will be appreciated that improvements would be beneficial in the art of measuring fluid flow. Such improvements could find use in operations other than well operations, as well.

SUMMARY

In the disclosure below, a fluidic oscillator flowmeter is provided which brings improvements to the art. One example is described below in which alternating fluid paths of the oscillator cross each other. Another example is described below in which the oscillator can produce relatively low frequency oscillations in fluid flow. Yet another example is described below in which fluid flow rate through the fluidic oscillator can be conveniently measured.

In one aspect, this disclosure provides to the art a fluidic oscillator. The fluidic oscillator can include a fluid switch, and at least two fluid paths from the fluid switch. A sensor measures a frequency of flow of the fluid through the fluid paths.

In another aspect, this disclosure provides to the art a method of measuring a flow rate of a fluid. The method can include flowing the fluid through a fluidic oscillator, a majority of the fluid flowing alternately via at least two fluid paths from a fluid switch of the fluidic oscillator. A sensor detects a frequency of the flow alternating between the fluid paths.

In yet another aspect, a fluidic oscillator described below can include a fluid input, and at least two fluid paths from the fluid input to respective fluid outputs, whereby a majority of fluid which flows through the fluidic oscillator flows alternately via the fluid paths. A sensor detects pressure fluctuations due to the flow alternating between the fluid paths.

These and other features, advantages and benefits will become apparent to one of ordinary skill in the art upon careful consideration of the detailed description of representative examples below and the accompanying drawings, in which similar elements are indicated in the various figures using the same reference numbers.

DETAILED DESCRIPTION

Figure 1:
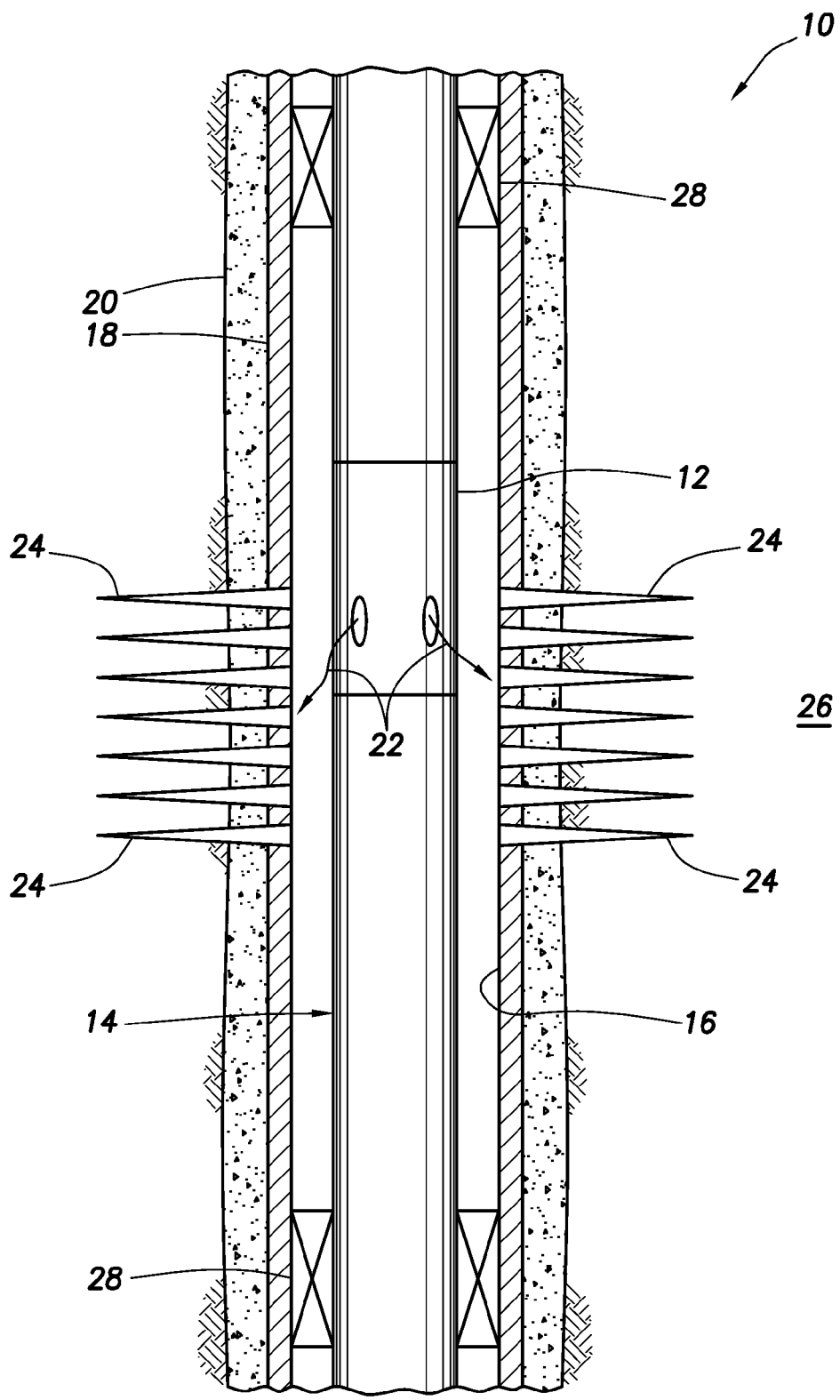
FIG. 1 is a representative partially cross-sectional view of a well system and associated method which can embody principles of the present disclosure.

Representatively illustrated in FIG. 1 is a well system 10 and associated method which can embody principles of this disclosure. In this example, a well tool 12 is interconnected in a tubular string 14 installed in a wellbore 16. The wellbore 16 is lined with casing 18 and cement 20. The well tool 12 is used to produce oscillations in flow of fluid 22 injected through perforations 24 into a formation 26 penetrated by the wellbore 16.

The fluid 22 could be steam, water, gas, fluid previously produced from the formation 26, fluid produced from another formation or another interval of the formation 26, or any other type of fluid from any source. It is not necessary, however, for the fluid 22 to be flowed outward into the formation 26 or outward through the well tool 12, since the principles of this disclosure are also applicable to situations in which fluid is produced from a formation, or in which fluid is flowed inwardly through a well tool.

Broadly speaking, this disclosure is not limited at all to the one example depicted in FIG. 1 and described herein. Instead, this disclosure is applicable to a variety of different circumstances in which, for example, the wellbore 16 is not cased or cemented, the well tool 12 is not interconnected in a tubular string 14 secured by packers 28 in the wellbore, etc. This disclosure provides for measuring flow of any fluid (including, but not limited to, liquids, gases, slurries, etc.), and whether or not that flow occurs in a well.

Figure 2:
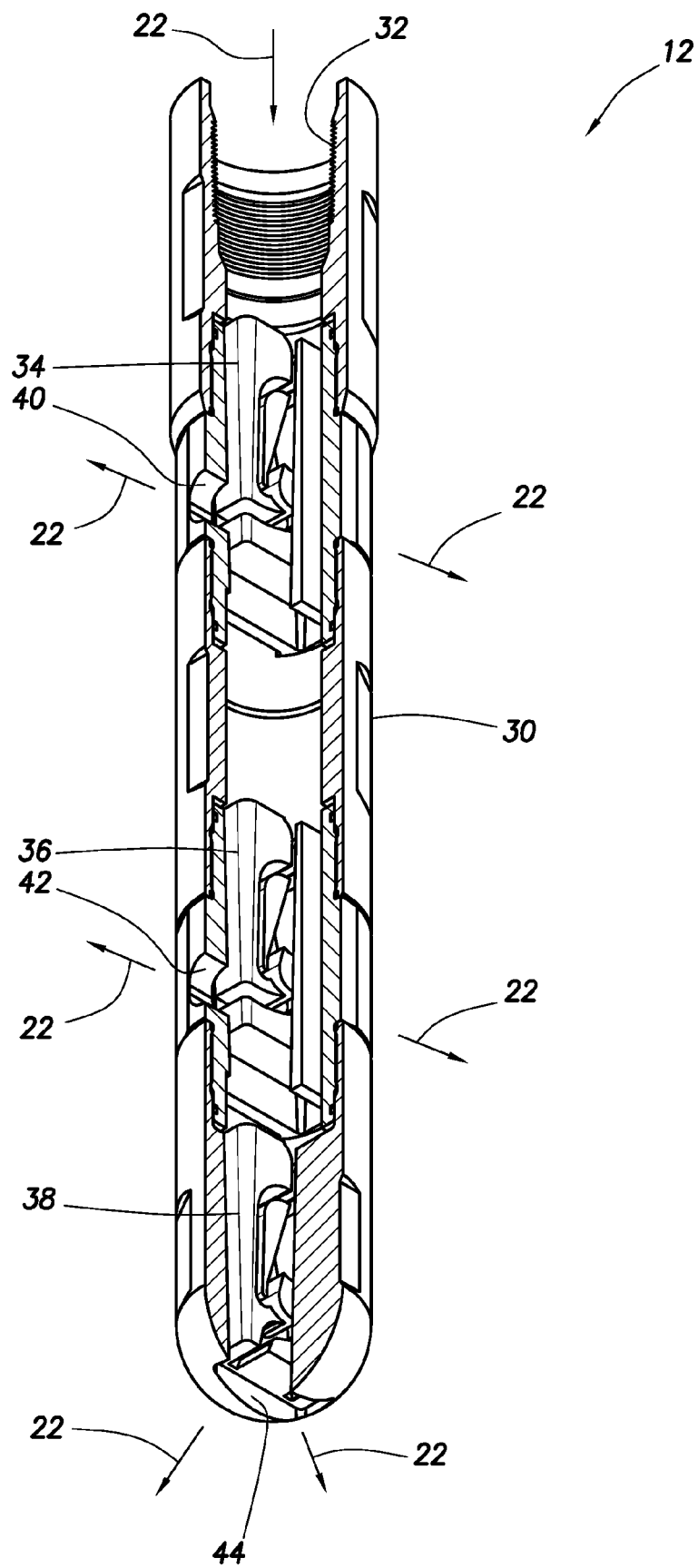
FIG. 2 is a representative partially cross-sectional isometric view of a well tool which may be used in the well system and method of FIG. 1.

Referring additionally now to FIG. 2, an example of the well tool 12 which may be used in the system 10 and method of FIG. 1 is representatively illustrated. However, the well tool 12 could be used in other systems and methods, in keeping with the principles of this disclosure.

The well tool 12 depicted in FIG. 2 has an outer housing assembly 30 with a threaded connector 32 at an upper end thereof. This example is configured for attachment at a lower end of a tubular string, and so there is not another connector at a lower end of the housing assembly 30, but one could be provided if desired.

Secured within the housing assembly 30 are three inserts 34, 36, 38. The inserts 34, 36, 38 produce oscillations in the flow of the fluid 22 through the well tool 12.

More specifically, the upper insert 34 produces oscillations in the flow of the fluid 22 outwardly through two opposing ports 40 (only one of which is visible in FIG. 2) in the housing assembly 30. The middle insert 36 produces oscillations in the flow of the fluid 22 outwardly through two opposing ports 42 (only one of which is visible in FIG. 2). The lower insert 38 produces oscillations in the flow of the fluid 22 outwardly through a port 44 in the lower end of the housing assembly 30.

Of course, other numbers and arrangements of inserts and ports, and other directions of fluid flow may be used in other examples. FIG. 2 depicts merely one example of a possible configuration of the well tool 12.

Figure 3:
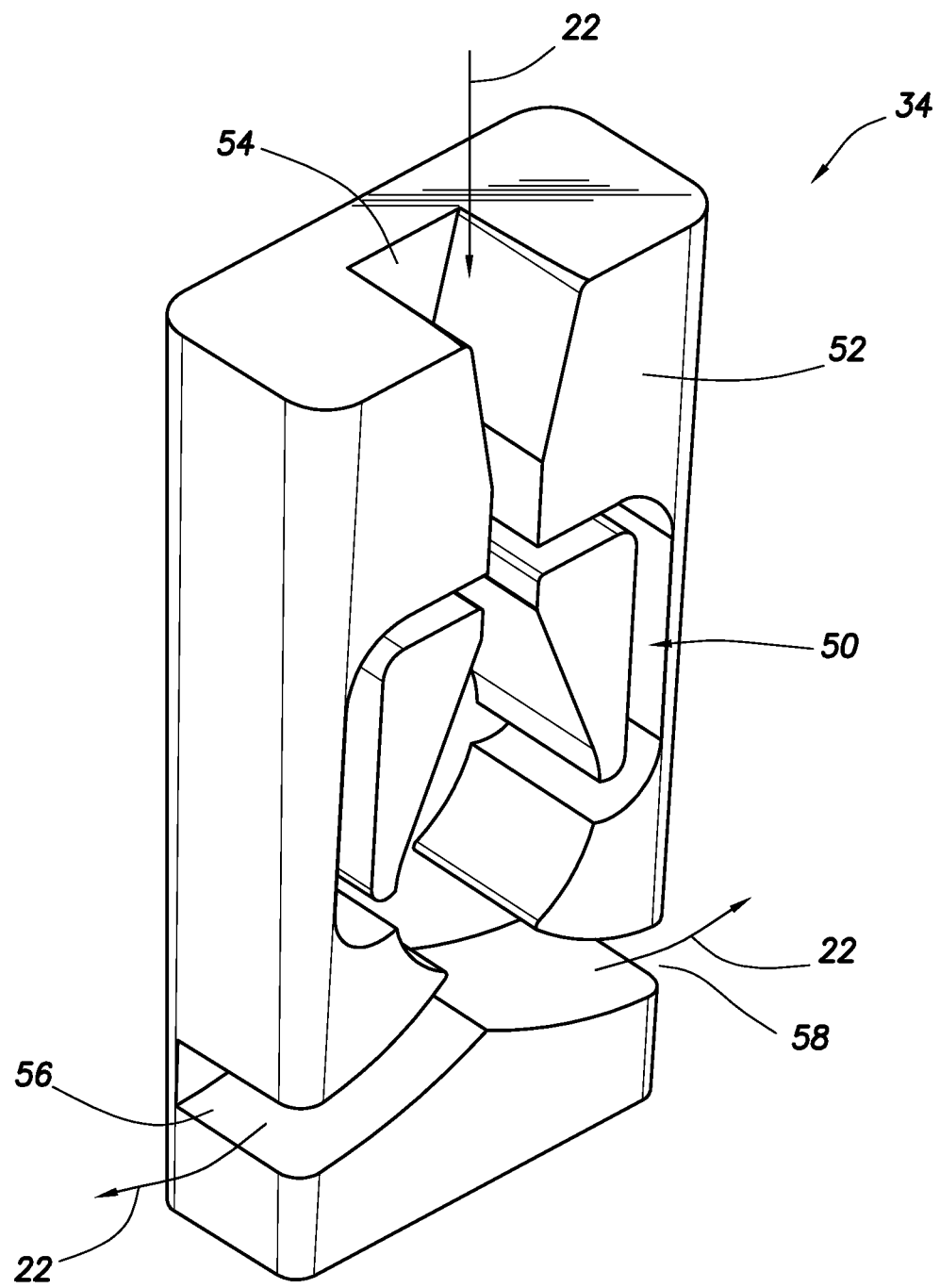
FIG. 3 is a representative isometric view of an insert which may be used in the well tool of FIG. 2.

Referring additionally now to FIG. 3, an enlarged scale view of one example of the insert 34 is representatively illustrated. The insert 34 may be used in the well tool 12 described above, or it may be used in other well tools in keeping with the principles of this disclosure.

The insert 34 depicted in FIG. 3 has a fluidic oscillator 50 machined, molded, cast or otherwise formed therein. In this example, the fluidic oscillator 50 is formed into a generally planar side 52 of the insert 34, and that side is closed off when the insert is installed in the well tool 12, so that the fluid oscillator is enclosed between its fluid input 54 and two fluid outputs 56, 58.

The fluid 22 flows into the fluidic oscillator 50 via the fluid input 54, and at least a majority of the fluid 22 alternately flows through the two fluid outputs 56, 58.

That is, the majority of the fluid 22 flows outwardly via the fluid output 56, then it flows outwardly via the fluid output 58, then it flows outwardly through the fluid output 56, then through the fluid output 58, etc., back and forth repeatedly.

In the example of FIG. 3, the fluid outputs 56, 58 are oppositely directed (e.g., facing about 180 degrees relative to one another), so that the fluid 22 is alternately discharged from the fluidic oscillator 50 in opposite directions. In other examples (including some of those described below), the fluid outputs 56, 58 could be otherwise directed.

It also is not necessary for the fluid outputs 56, 58 to be structurally separated as in the example of FIG. 3. Instead, the fluid outputs 56, 58 could be different areas of a larger output opening as in the example of FIG. 7 described more fully below.

Figure 4:
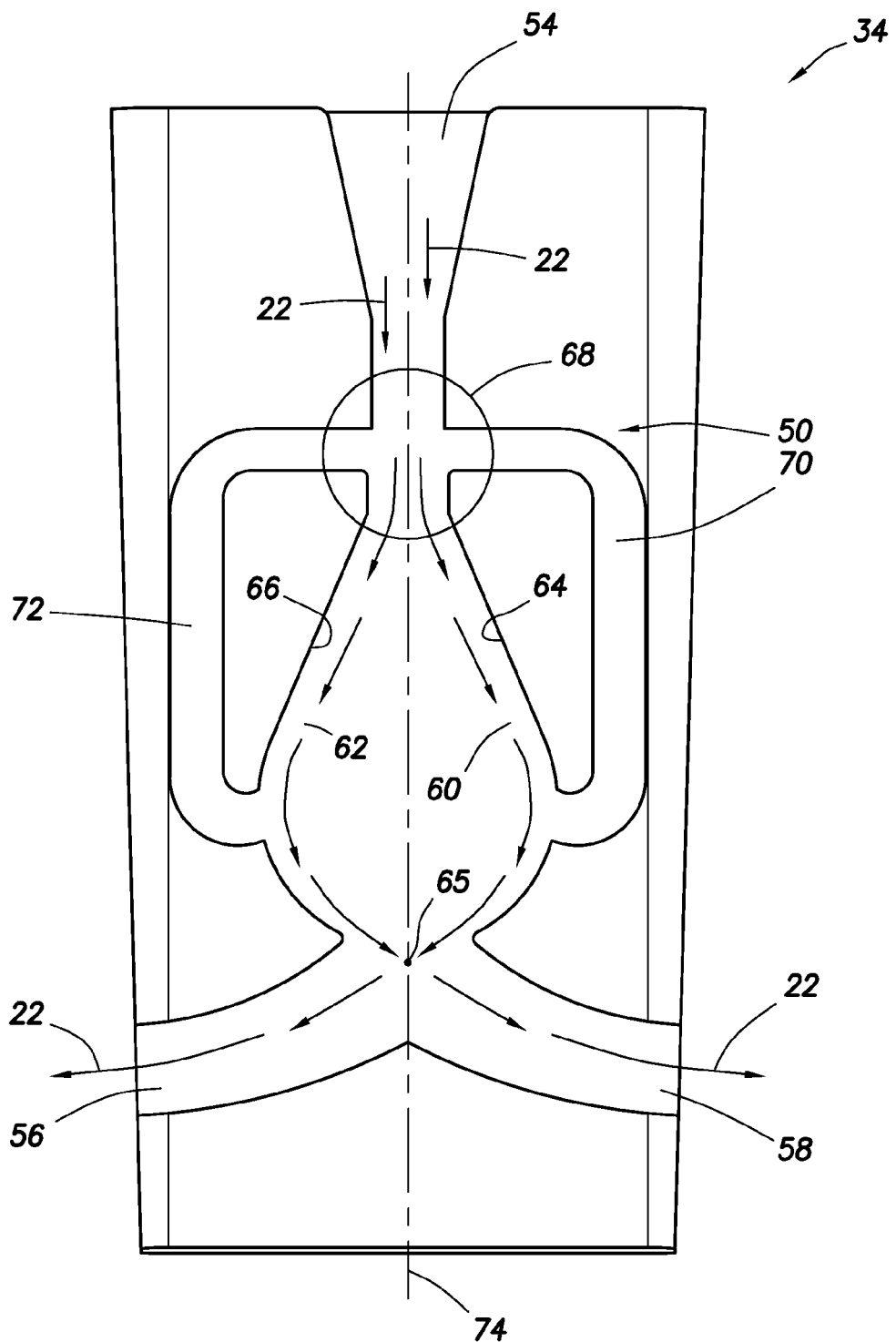
FIG. 4 is a representative elevational view of a fluidic oscillator formed in the insert of FIG. 3, which fluidic oscillator can embody principles of this disclosure.

Referring additionally now to FIG. 4, The fluidic oscillator 50 is representatively illustrated in an elevational view of the insert 34. However, it should be clearly understood that it is not necessary for the fluid oscillator 50 to be positioned in the insert 34 as depicted in FIG. 4, and the fluidic oscillator could be positioned in other inserts (such as the inserts 36, 38, etc.) or in other devices, in keeping with the principles of this disclosure.

The fluid 22 is received into the fluidic oscillator 50 via the inlet 54, and a majority of the fluid flows from the inlet to either the outlet 56 or the outlet 58 at any given point in time (although there may be an instant when the flows to the outlets are equal). The fluid 22 flows from the inlet 54 to the outlet 56 via one fluid path 60, and the fluid flows from the inlet to the other outlet 58 via another fluid path 62.

In one unique aspect of the fluidic oscillator 50, the two fluid paths 60, 62 cross each other at a crossing 65. A location of the crossing 65 is determined by shapes of walls 64, 66 of the fluidic oscillator 50 which outwardly bound the fluid paths 60, 62.

When a majority of the fluid 22 flows via the fluid path 60, the well-known Coanda effect tends to maintain the flow adjacent the wall 64. When a majority of the fluid 22 flows via the fluid path 62, the Coanda effect tends to maintain the flow adjacent the wall 66.

A fluid switch 68 is used to alternate the flow of the fluid 22 between the two fluid paths 60, 62. The fluid switch 68 is formed at an intersection between the inlet 54 and the two fluid paths 60, 62.

A feedback fluid path 70 is connected between the fluid switch 68 and the fluid path 60 downstream of the fluid switch and upstream of the crossing 65. Another feedback fluid path 72 is connected between the fluid switch 68 and the fluid path 62 downstream of the fluid switch and upstream of the crossing 65.

When pressure in the feedback fluid path 72 is greater than pressure in the other feedback fluid path 70, the fluid 22 will be influenced to flow toward the fluid path 60. When pressure in the feedback fluid path 70 is greater than pressure in the other feedback fluid path 72, the fluid 22 will be influenced to flow toward the fluid path 62. These relative pressure conditions are alternated back and forth, resulting in a majority of the fluid 22 flowing alternately via the fluid paths 60, 62.

For example, if initially a majority of the fluid 22 flows via the fluid path 60 (with the Coanda effect acting to maintain the fluid flow adjacent the wall 64), pressure in the feedback fluid path 70 will become greater than pressure in the feedback fluid path 72. This will result in the fluid 22 being influenced (in the fluid switch 68) to flow via the other fluid path 62.

When a majority of the fluid 22 flows via the fluid path 62 (with the Coanda effect acting to maintain the fluid flow adjacent the wall 66), pressure in the feedback fluid path 72 will become greater than pressure in the feedback fluid path 70. This will result in the fluid 22 being influenced (in the fluid switch 68) to flow via the other fluid path 60.

Thus, a majority of the fluid 22 will alternate between flowing via the fluid path 60 and flowing via the fluid path 62. Note that, although the fluid 22 is depicted in FIG. 4 as simultaneously flowing via both of the fluid paths 60, 62, in practice a majority of the fluid 22 will flow via only one of the fluid paths at a time.

Note that the fluidic oscillator 50 of FIG. 4 is generally symmetrical about a longitudinal axis 74. The fluid outputs 56, 58 are on opposite sides of the longitudinal axis 74, the feedback fluid paths 70, 72 are on opposite sides of the longitudinal axis, etc.

Figure 5:
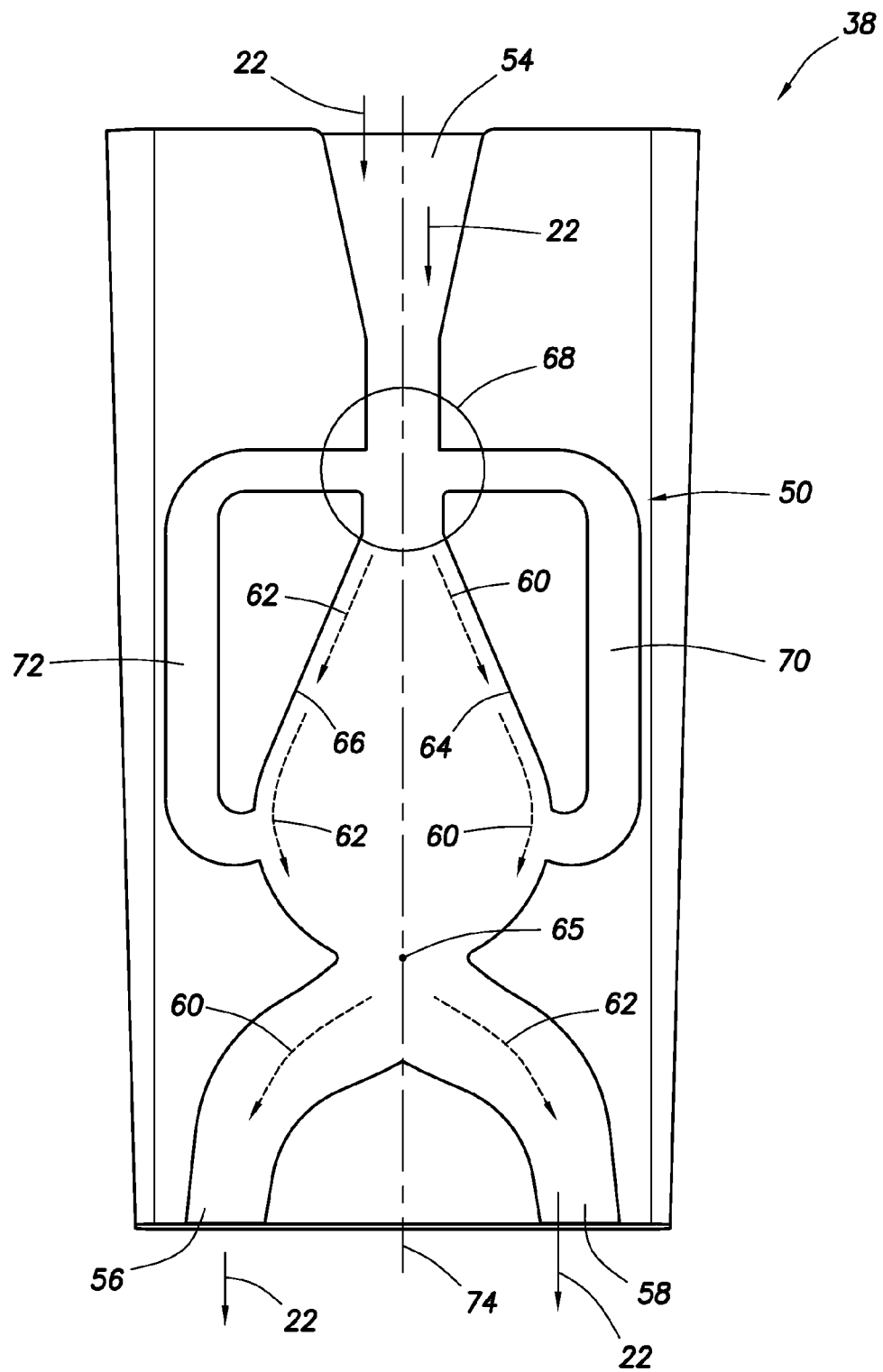
FIGS. 5-10 are additional configurations of the fluidic oscillator.

Referring additionally now to FIG. 5, another configuration of the fluidic oscillator 50 is representatively illustrated. In this configuration, the fluid outputs 56, 58 are not oppositely directed.

Instead, the fluid outputs 56, 58 discharge the fluid 22 in the same general direction (downward as viewed in FIG. 5). As such, the fluidic oscillator 50 of FIG. 5 would be appropriately configured for use in the lower insert 38 in the well tool 12 of FIG. 2.

Figure 6:
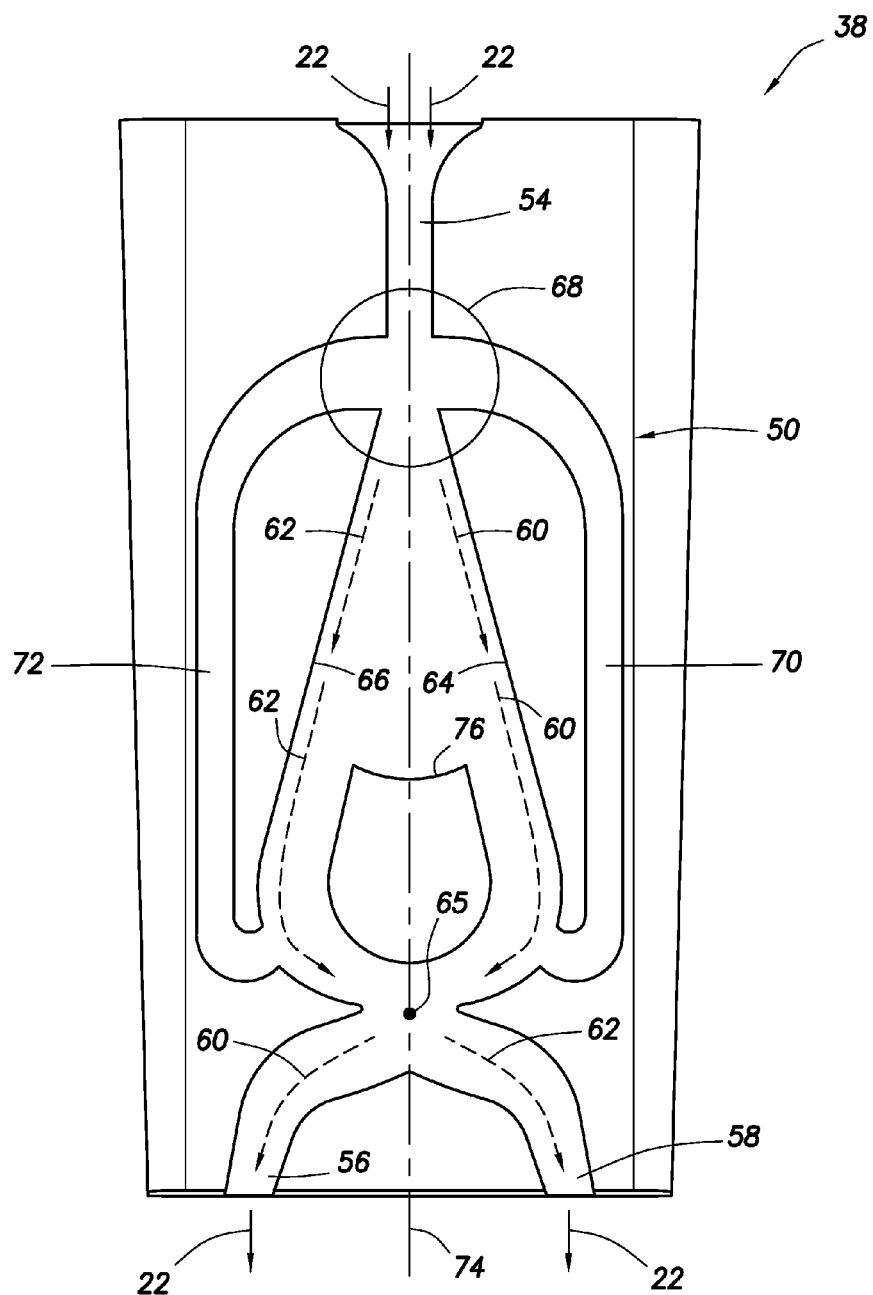

Referring additionally now to FIG. 6, another configuration of the fluidic oscillator 50 is representatively illustrated. In this configuration, a structure 76 is interposed between the fluid paths 60, 62 just upstream of the crossing 65.

The structure 76 beneficially reduces a flow area of each of the fluid paths 60, 62 upstream of the crossing 65, thereby increasing a velocity of the fluid 22 through the crossing and somewhat increasing the fluid pressure in the respective feedback fluid paths 70, 72.

This increased pressure is alternately present in the feedback fluid paths 70, 72, thereby producing more positive switching of fluid paths 60, 62 in the fluid switch 68. In addition, when initiating flow of the fluid 22 through the fluidic oscillator 50, an increased pressure difference between the feedback fluid paths 70, 72 helps to initiate the desired switching back and forth between the fluid paths 60, 62.

Figure 7:
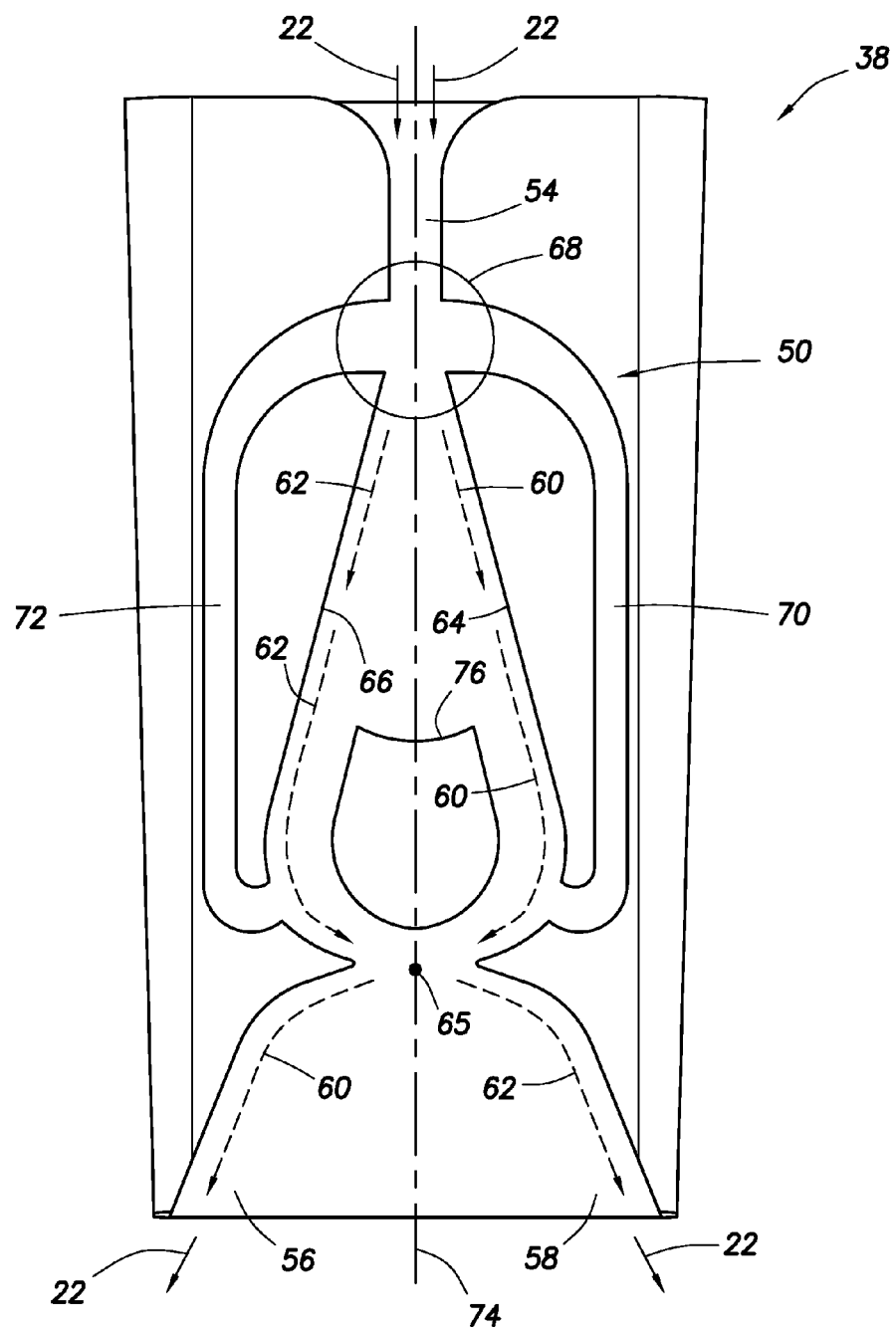

Referring additionally now to FIG. 7, another configuration of the fluidic oscillator 50 is representatively illustrated. In this configuration, the fluid outputs 56, 58 are not separated by any structure.

However, a majority of the fluid 22 will exit the fluidic oscillator 50 of FIG. 7 via either the fluid path 60 or the fluid path 62 at any given time. Therefore, the fluid outputs 56, 58 are defined by the regions of the fluidic oscillator 50 via which the fluid 22 exits the fluidic oscillator along the respective fluid paths 60, 62.

Figure 8:
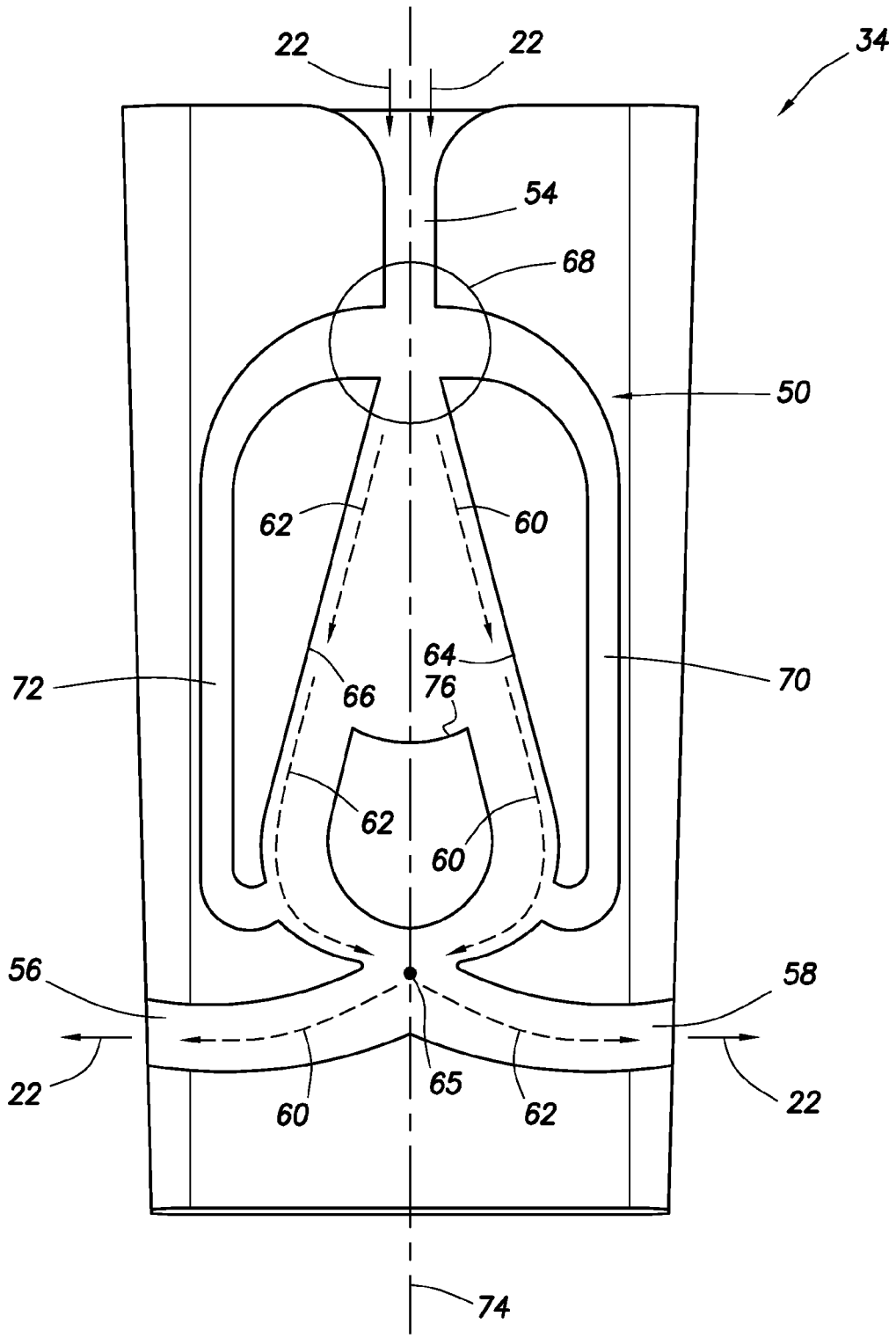

Referring additionally now to FIG. 8, another configuration of the fluidic oscillator is representatively illustrated. In this configuration, the fluid outputs 56, 58 are oppositely directed, similar to the configuration of FIG. 4, but the structure 76 is interposed between the fluid paths 60, 62, similar to the configuration of FIGS. 6 & 7.

Thus, the FIG. 8 configuration can be considered a combination of the FIGS. 4, 6 & 7 configurations. This demonstrates that any of the features of any of the configurations described herein can be used in combination with any of the other configurations, in keeping with the principles of this disclosure.

Figure 9:
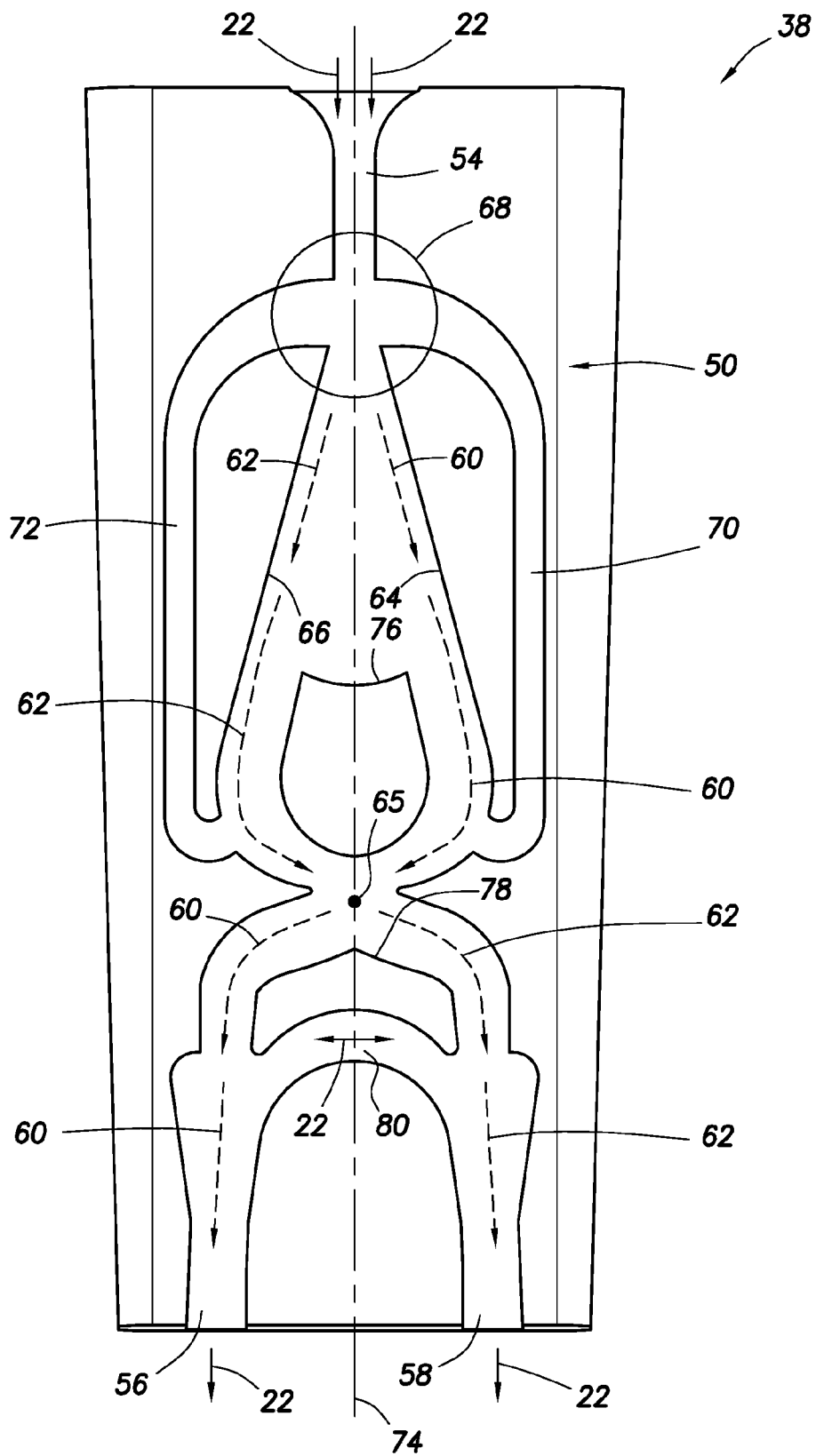

Referring additionally now to FIG. 9, another configuration of the fluidic oscillator 50 is representatively illustrated. In this configuration, another structure 78 is interposed between the fluid paths 60, 62 downstream of the crossing 65.

The structure 78 reduces the flow areas of the fluid paths 60, 62 just upstream of a fluid path 80 which connects the fluid paths 60, 62. The velocity of the fluid 22 flowing through the fluid paths 60, 62 is increased due to the reduced flow areas of the fluid paths.

The increased velocity of the fluid 22 flowing through each of the fluid paths 60, 62 can function to draw some fluid from the other of the fluid paths. For example, when a majority of the fluid 22 flows via the fluid path 60, its increased velocity due to the presence of the structure 78 can draw some fluid through the fluid path 80 into the fluid path 60. When a majority of the fluid 22 flows via the fluid path 62, its increased velocity due to the presence of the structure 78 can draw some fluid through the fluid path 80 into the fluid path 62.

It is possible that, properly designed, this can result in more fluid being alternately discharged from the fluid outputs 56, 58 than fluid 22 being flowed into the input 54. Thus, fluid can be drawn into one of the outputs 56, 58 while fluid is being discharged from the other of the outputs.

Figure 10:
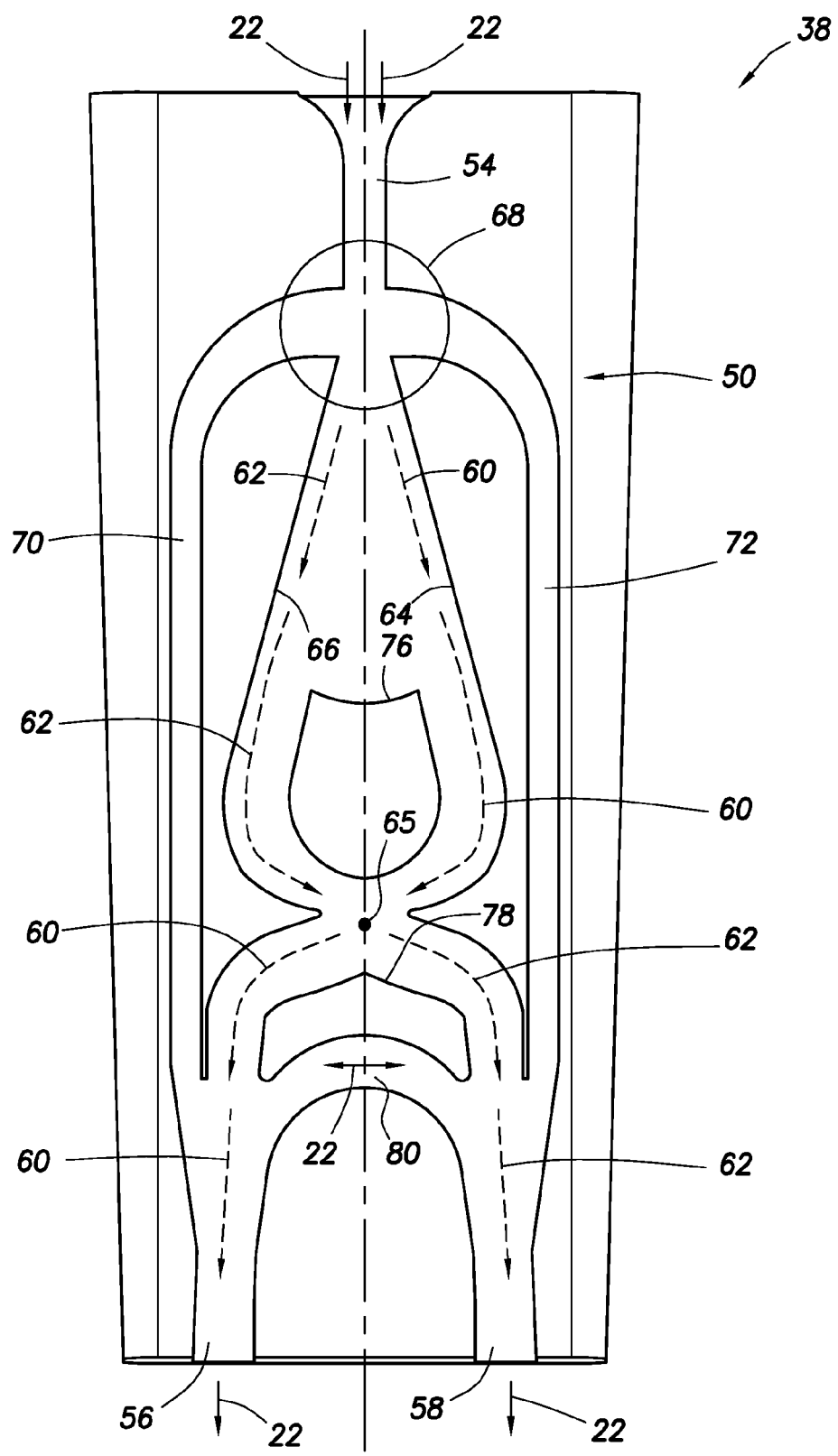

Referring additionally now to FIG. 10, another configuration of the fluidic oscillator 50 is representatively illustrated. In this configuration, computational fluid dynamics modeling has shown that a flow rate of fluid discharged from one of the outputs 56, 58 can be greater than a flow rate of fluid 22 directed into the input 54.

Fluid can be drawn from one of the outputs 56, 58 to the other output via the fluid path 80. Thus, fluid can enter one of the outputs 56, 58 while fluid is being discharged from the other output.

This is due in large part to the increased velocity of the fluid 22 caused by the structure 78 (e.g., the increased velocity of the fluid in one of the fluid paths 60, 62 causes eduction of fluid from the other of the fluid paths 60, 62 via the fluid path 80). At the intersections between the fluid paths 60, 62 and the respective feedback fluid paths 70, 72, pressure can be significantly reduced due to the increased velocity, thereby reducing pressure in the respective feedback fluid paths.

In the FIG. 10 example, a reduction in pressure in the feedback fluid path 70 will influence the fluid 22 to flow via the fluid path 62 from the fluid switch 68 (due to the relatively higher pressure in the other feedback fluid path 72). Similarly, a reduction in pressure in the feedback fluid path 72 will influence the fluid 22 to flow via the fluid path 60 from the fluid switch 68 (due to the relatively higher pressure in the other feedback fluid path 70).

One difference between the FIGS. 9 & 10 configurations is that, in the FIG. 10 configuration, the feedback fluid paths 70, 72 are connected to the respective fluid paths 60, 62 downstream of the crossing 65. Computational fluid dynamics modeling has shown that this arrangement produces desirably low frequency oscillations of flow from the outputs 56, 58, although such low frequency oscillations are not necessary in keeping with the principles of this disclosure.

The fluidic oscillator 50 of FIG. 10 creates pressure and/or flow rate oscillations in the fluid 22. As with the other fluidic oscillator 50 configurations described herein, such pressure and/or flow rate oscillations can be used for a variety of purposes. Some of these purposes can include: 1) to preferentially flow a desired fluid, 2) to reduce flow of an undesired fluid, 3) to determine viscosity of the fluid 22, 4) to determine the composition of the fluid, 5) to cut through a formation or other material with pulsating jets, 6) to generate electricity in response to vibrations or force oscillations, 7) to produce pressure and/or flow rate oscillations in produced or injected fluid flow, 8) for telemetry (e.g., to transmit signals via pressure and/or flow rate oscillations), 9) as a pressure drive for a hydraulic motor, 10) to clean well screens with pulsating flow, 11) to clean other surfaces with pulsating jets, 12) to promote uniformity of a gravel pack, 13) to enhance stimulation operations (e.g., acidizing, conformance or consolidation treatments, etc.), 14) any other operation which can be enhanced by oscillating flow rate, pressure, and/or force or displacement produced by oscillating flow rate and/or pressure, etc.

In some circumstances (such as stimulation operations, etc.), the flow rate through the fluidic oscillator 50 may remain substantially constant while a pressure differential across the fluidic oscillator oscillates. In other circumstances (such as production operations, etc.), a substantially constant pressure differential may be maintained across the fluidic oscillator while a flow rate of the fluid 22 through the fluidic oscillator oscillates.

Figure 11:
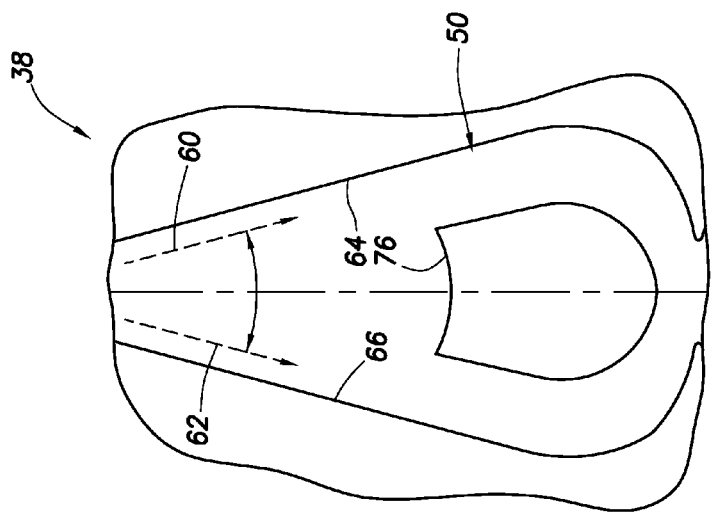
FIG. 11 is an enlarged scale representative elevational view of a portion of the fluidic oscillator of FIG. 6.

Referring additionally now to FIG. 11, an enlarged scale view of a portion of the fluidic oscillator 50 of FIG. 6 is representatively illustrated. In this view, it can be more readily observed that the fluid 22 flow sweeps back and forth between the fluid paths 60, 62 in the fluidic oscillator 50. As the flow of the fluid 22 sweeps back and forth, it traverses an upper (as viewed in FIG. 11) surface of the structure 76.

It will be appreciated by those skilled in the art that pressure fluctuations will be experienced in various areas of the fluidic oscillator 50 due to the flow of the fluid 22 alternating between the fluid paths 60, 62. For example, the pressure in the feedback fluid paths 70, 72, in the fluid switch 68, at the input 54, at the outputs 56, 58, in the fluid paths 60, 62, and at the upper surface of the structure 76 will fluctuate as the majority of the fluid 22 alternately flows through the fluid paths.

Figure 12:
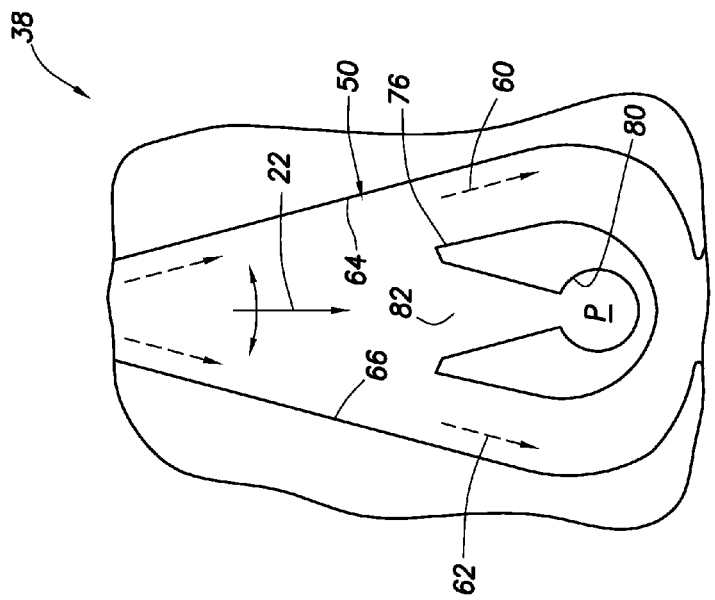
FIG. 12 is a representative elevational view of the fluidic oscillator modified in a manner incorporating principles of this disclosure.

Referring additionally now to FIG. 12, another configuration of the fluidic oscillator 50 is representatively illustrated. In this configuration, the structure 76 has been modified, so that a chamber 80 is formed therein. An inlet 82 to the chamber 80 is positioned in the upper surface of the structure 76, between the fluid paths 60, 62.

As the flow of the majority of the fluid 22 changes direction from one of the fluid paths 60, 62 to the other, the flow will be momentarily directed toward the inlet 82 as depicted in FIG. 12. It will be appreciated that this will result in a momentary increase in pressure P in the chamber 80, relative to pressure in the chamber when the flow is directed along one of the fluid paths 60, 62.

Figure 13:
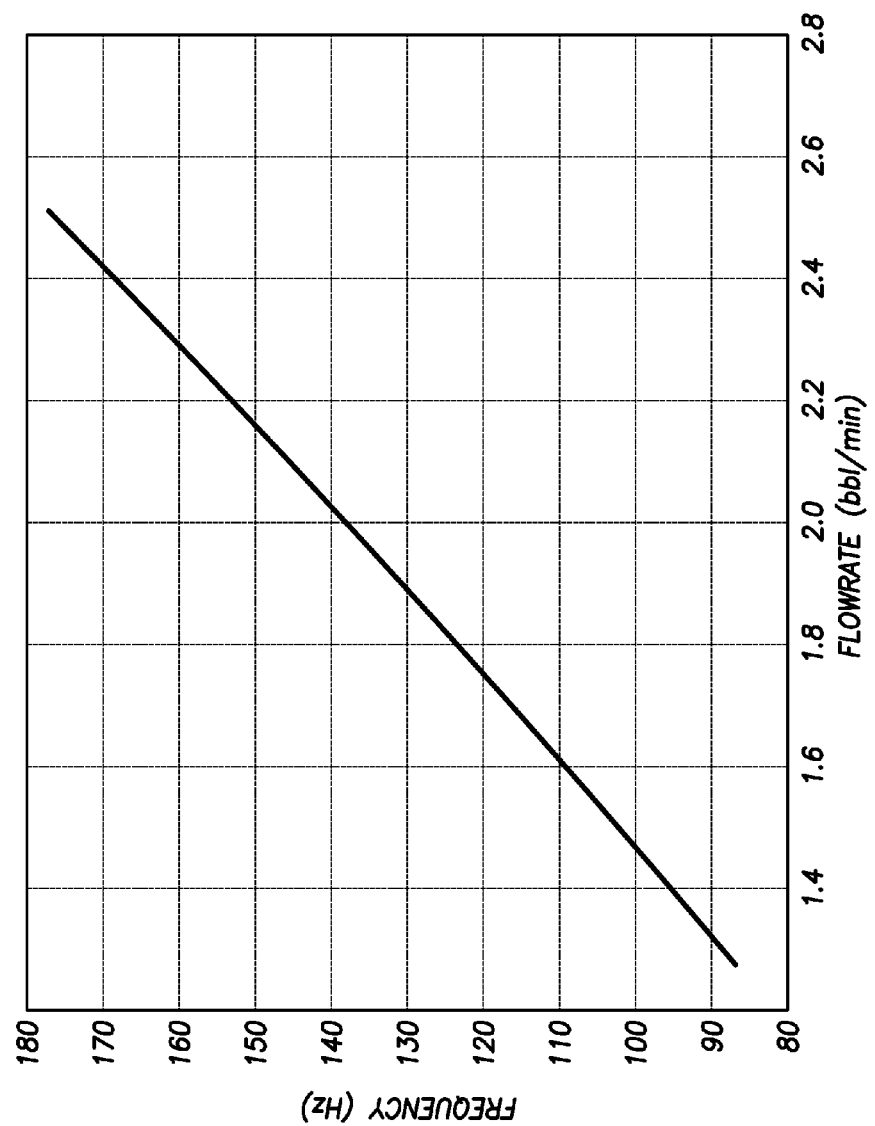
FIG. 13 is a representative graph of frequency versus flow rate for the fluidic oscillator of FIG. 12.

By measuring the pressure P fluctuations in the chamber 80, a frequency of the flow alternating between the fluid paths 60, 62 can be determined. For a simulated fluidic oscillator constructed similar to the fluidic oscillator 50 of FIG. 12, a frequency of the flow alternating between the flow paths 60, 62 is very closely directly proportional to the volumetric flow rate of the fluid 22 through the fluidic oscillator, as depicted in FIG. 13.

Therefore, by measuring the frequency of the flow through the fluid paths 60, 62, the corresponding flow rate of the fluid 22 through the fluidic oscillator 50 can be readily determined. Note, however, that the frequency of fluctuations in the flow can be measured at locations other than the structure 76 (for example, at any of the locations described above which experience pressure fluctuations due to the alternating flow between the fluid paths 60, 62).

Note, also, that it is not necessary for the chamber 80 to be positioned in the structure 76, or for the inlet 82 to be positioned at an upper surface of the structure, or between the fluid paths 60, 62.

Figure 14:
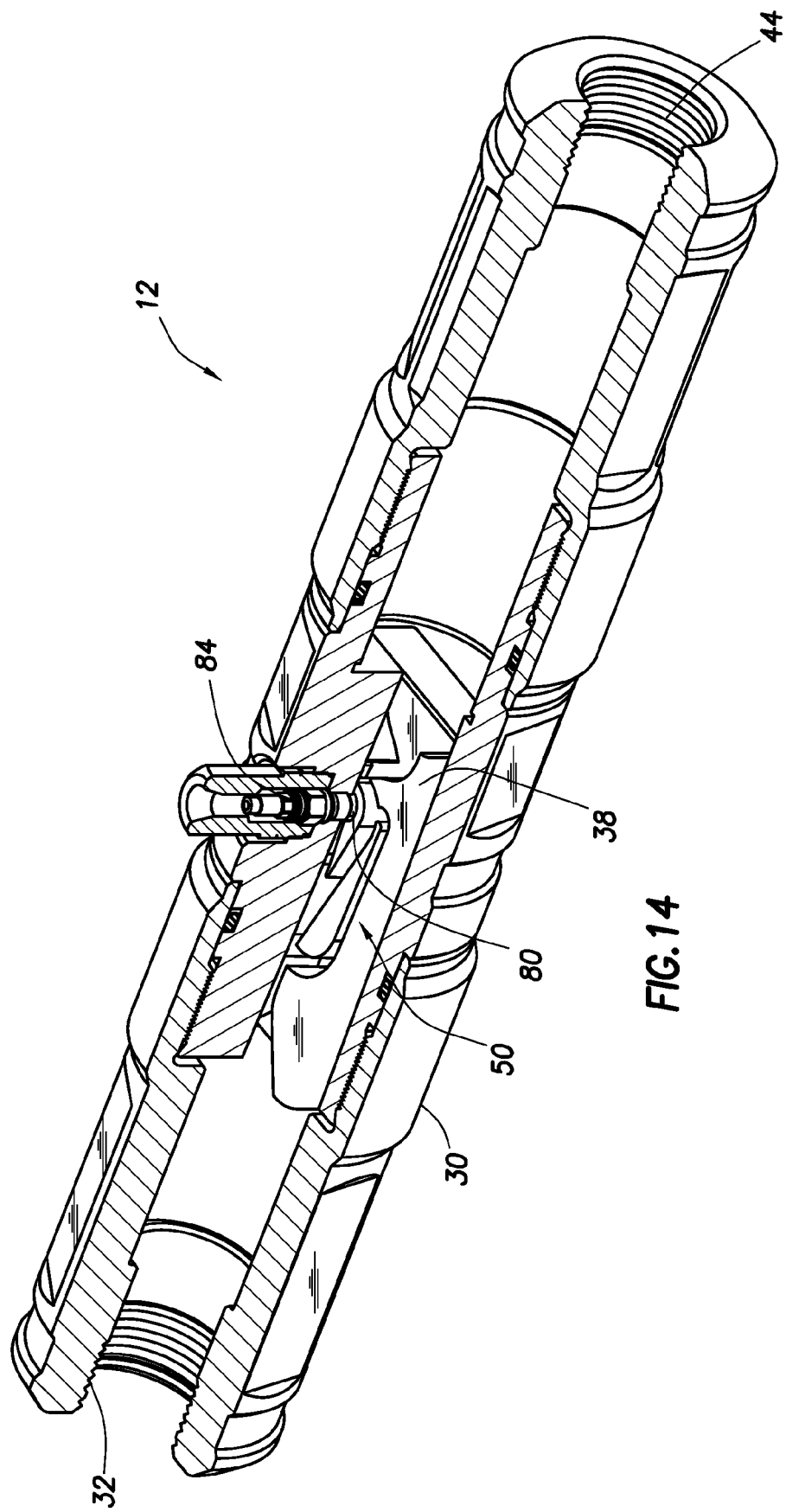
FIG. 14 is a representative perspective view of the well tool having the fluidic oscillator of FIG. 12 incorporated therein.

Referring additionally now to FIG. 14, the well tool 12 is representatively illustrated in another configuration in which the insert 38 having the fluidic oscillator 50 of FIG. 12 is installed in the housing assembly 30. A sensor 84 is installed through the housing assembly 30, so that it is in communication with the chamber 80.

In this example, the sensor 84 detects the pressure fluctuations due to the flow alternating between the fluid paths 60, 62 in the fluidic oscillator 50. Of course, other types of sensors (e.g., acoustic sensors, temperature sensors, etc.) may be used to detect the fluctuations in fluid flow through the fluidic oscillator 50, if desired. Preferably, however, the sensor 84 is at least capable of responding to a range of frequencies which will be experienced in actual practice.

In some examples, the sensor 84 could comprise an optical sensor. The optical sensor could be an optical pressure sensor, or another type of optical sensor (e.g., a flow sensor, an acoustic or vibration sensor, etc.).

Light could be transmitted to and from the optical sensor via, for example, one or more optical waveguides (such as optical fibers, optical ribbons, etc.), which may extend to a remote location (such as the earth's surface). Alternatively, the light could be generated on-board the well tool 12 or at another location.

Suitable optical sensors include (but are not limited to) those described in U.S. patent application Ser. No. 13/004135, filed 11 Jan. 2011, and in U.S. Pat. Nos. 7,511,823, 7,159,468, 6,747,743 and 6,233,746, the entire disclosures of which are incorporated herein by this reference. Optical sensors can, in some examples, enable construction of a downhole passive (e.g., no downhole electronics or electrical power needed) flowmeter.

Any type of optical pressure sensor can be used, but preferably the sensor has a high enough sample rate to faithfully determine pressure pulse frequency. Of secondary importance is the absolute value of the pressure in the chamber 80.

Of primary importance in this example is whether the pressure is fluctuating, and at what frequency it is fluctuating. Thus, an optical pressure transducer is not necessary.

A straightforward optical strain sensor mounted on the outside of the oscillator 50, preferably on the outside of a relatively thin section of the oscillator, would suffice for the sensor 84. Fluctuating pressures will cause fluctuating strain in the thin section of the oscillator 50. Note that strain may be detected in any component of the oscillator 50 in keeping with the scope of this disclosure.

Common optical strain sensors include fiber Bragg gratings (FBGs), which are commercially available, as is the interrogation equipment they require. Another optical strain sensor example would be an intrinsic Fabry-Perot sensor. Several, classical types of fiber interferometers (Fabry-Perot, Mach-Zehnder, Michaelson or Sagnac) would also serve as suitable strain gauges to detect pressure frequency. Their design, construction, analysis and interrogation techniques are well known to those skilled in the art. Interferometric strain sensors have the additional advantage that, within reason, they can be constructed as sensitive as desired. Thus, they can detect very small strains on the outside of thicker pressure vessels.

The FIG. 14 configuration is for a test of the fluidic oscillator 50, and so it does not necessarily represent how the well tool 12 would be configured in actual practice. Preferably, the sensor 84 would not protrude from the housing assembly 30 in an actual constructed embodiment.

The well tool 12 can comprise a flowmeter apart from its capability of producing fluctuations in flow of the fluid 22 through the well tool. Indeed, a primary purpose of the well tool 12 could be to measure flow rate, rather than to produce fluctuations in flow of the fluid 22.

For example, the well tool 12 could be connected in parallel with another conduit through which the fluid 22 flows. A flow rate of the fluid 22 through the conduit could be inferred from a flow rate of the fluid through the fluidic oscillator 50 of the well tool 12, which is measured by detecting the frequency of pressure fluctuations in the fluidic oscillator.

In this manner, the flow rate through the conduit could be determined, without obstructing flow through the conduit, and without requiring use of any moving parts (of course, a flow restriction could be present in the conduit, for example, to induce flow through the fluidic oscillator 50, and moving parts could be used, if desired). In another alternative, the fluidic oscillator 50 could be connected in a bypass passage of the well tool 12 itself, whereby only a portion of the fluid 22 which flows through the well tool also flows through the fluidic oscillator.

Thus, it should be clearly understood that a large variety of possible configurations exist, and the principles of this disclosure are not limited at all to the details of the examples described above. For example, although the fluidic oscillator 50 described above includes two of the fluid paths 60, 62 and two of the corresponding fluid outputs 56, 58, any number of these elements (and other elements of the fluidic oscillator 50) may be used, if desired.

One feature of the fluidic oscillator 50 described above is that the pressure pulses due to flow alternating between the fluid paths 60, 62 is measured in the chamber 80, which is a flow stagnation area, and which is directly impinged by the flow (preferably, a fluid jet) from the fluid switch 68. Thus, the pressure pulses should be readily detectable by the sensor 84.

Although FIG. 14 depicts the sensor 84 as being in direct contact with the chamber 80, in other examples the sensor 84 could be connected to the chamber via a conduit or other flow path, so that the sensor is more or less remote from the chamber.

In the examples described above, the flow of the fluid 22 traverses the inlet 82 two times in each cycle of alternating flow between the fluid paths 60, 62, and so the sensor 84 will detect two pressure pulses for each cycle. Thus, the frequency of the fluctuations in flow through the fluidic oscillator 50 can be conveniently calculated as half of the frequency of the pressure pulses detected by the sensor 84.

It can now be fully appreciated that the above disclosure provides several advancements to the art of measuring flow rate. In examples described above, a frequency of fluctuations in flow through a fluidic oscillator 50 provide an indication of a rate of the flow.

In one example, a fluidic oscillator 50 described above can include at least one fluid switch 68, multiple fluid paths 60, 62 from the fluid switch 68, and a sensor 84 which detects a frequency of fluctuations in flow through the fluidic oscillator 50.

The sensor 84 may detect the frequency of the flow which alternates between the fluid paths 60, 62.

A majority of fluid 22 may flow alternately via the fluid paths 60, 62 to respective fluid outputs 56, 58.

The fluid switch 68 may be positioned at an intersection of the fluid paths 60, 62 with an input 54 of the fluidic oscillator 50. The fluid paths 60, 62 may cross each other between the fluid input 54 and respective fluid outputs 56, 58.

The sensor 84 may comprise a pressure sensor. The sensor 84 may detect pressure fluctuations due to the flow alternating between the fluid paths 60, 62. The sensor 84 may detect two pressure pulses for each cycle of the flow alternating between the fluid paths 60, 62.

The sensor 84 may comprise an optical sensor.

The sensor 84 may detect pressure at a location between the fluid paths 60, 62. The sensor 84 may be in communication with a chamber 80 having an inlet 82 positioned between the fluid paths 60, 62.

A flow rate of fluid 22 through the fluidic oscillator 50 may be indicated by the frequency of the fluctuations in flow through the fluidic oscillator 50. The frequency of the fluctuations in flow through the fluidic oscillator 50 can vary in response to changes in flow rate of fluid 22 through the fluidic oscillator 50.

Also described above is a method of measuring a flow rate of a fluid 22. In one example, the method can include flowing the fluid 22 through a fluidic oscillator 50, a majority of the fluid 22 flowing alternately via multiple fluid paths 60, 62 from a fluid switch 68 of the fluidic oscillator 50; and a sensor 84 detecting a frequency of the flow alternating between the fluid paths 60, 62.

The above disclosure also provides to the art a fluidic oscillator 50, which can include at least one fluid input 54, and multiple fluid paths 60, 62 from the fluid input 54 to respective fluid outputs 56, 58, whereby a majority of fluid 22 which flows through the fluidic oscillator 50 flows alternately via the fluid paths 60, 62. A sensor 84 may detect pressure fluctuations due to the flow alternating between the fluid paths 60, 62.

The sensor 84 may measure pressure in a chamber 80 with an inlet 82 which is directly impinged by flow from the fluid input 54 and fluid switch 68. The sensor 84 may detect the pressure fluctuations at twice the frequency of the flow alternating between the fluid paths 60, 62.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

In the above description of the representative examples of the disclosure, directional terms, such as "above," "below," "upper," "lower," etc., are used for convenience in referring to the accompanying drawings. However, it should be clearly understood that the scope of this disclosure is not limited to any particular directions described herein.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure.

Accordingly, the foregoing detailed description is to be clearly understood as being given by way of illustration and example only, the spirit and scope of the present invention being limited solely by the appended claims and their equivalents.

What is claimed is:

1. A fluidic oscillator, comprising:
   at least one fluid switch;
   multiple fluid paths from the fluid switch to respective fluid outputs; and
   a sensor which detects a frequency of fluctuations in flow through the fluidic oscillator, wherein the fluid paths cross each other between the fluid switch and the respective fluid outputs.

2. The fluidic oscillator of claim 1, wherein the sensor detects the frequency of the flow which alternates between the fluid paths.

3. The fluidic oscillator of claim 1, wherein a majority of a fluid flows alternately via the fluid paths to the respective fluid outputs.

4. The fluidic oscillator of claim 1, wherein the fluid switch is at an intersection of the fluid paths with an input of the fluidic oscillator.

5. The fluidic oscillator of claim 1, wherein the sensor comprises a pressure sensor.

6. The fluidic oscillator of claim 1, wherein the sensor detects pressure fluctuations due to the flow alternating between the fluid paths.

7. The fluidic oscillator of claim 6, wherein the sensor detects two pressure pulses for each cycle of the flow alternating between the fluid paths.

8. The fluidic oscillator of claim 1, wherein the sensor is in communication with a chamber having an inlet positioned between the fluid paths.

9. The fluidic oscillator of claim 8, wherein the inlet is directly impinged by flow from the fluid switch.

10. The fluidic oscillator of claim 1, wherein a flow rate of fluid through the fluidic oscillator is indicated by the frequency of the fluctuations in flow.

11. The fluidic oscillator of claim 1, wherein the frequency of the fluctuations in flow varies in response to changes in flow rate through the fluidic oscillator.

12. The fluidic oscillator of claim 1, wherein the sensor detects pressure at a location between the fluid paths.

13. The fluidic oscillator of claim 1, wherein the sensor comprises an optical sensor.

14. The fluidic oscillator of claim 1, wherein the sensor comprises a strain sensor.

15. A method of measuring a flow rate of a fluid, the method comprising:
    flowing the fluid through a fluidic oscillator, a majority of the fluid flowing alternately via multiple fluid paths from a fluid switch of the fluidic oscillator to respective fluid outputs; and
    detecting a frequency of flow alternating between the fluid paths, the fluid paths crossing each other between the fluid switch and the respective fluid outputs.

16. The method of claim 15, wherein the majority of the fluid flows alternately via the fluid paths to respective fluid outputs.

17. The method of claim 15, wherein the fluid switch is at an intersection of the fluid paths with an input of the fluidic oscillator.

18. The method of claim 15, wherein the frequency of the alternating flow between the fluid paths is detected by a sensor.

19. The method of claim 18, wherein the sensor comprises a pressure sensor.

20. The method of claim 18, wherein the sensor detects pressure fluctuations due to the flow alternating between the fluid paths.

21. The method of claim 18, wherein the sensor is in communication with a chamber having an inlet positioned between the fluid paths.

22. The method of claim 21, wherein the inlet is directly impinged by the flow from the fluid switch.

23. The method of claim 15, wherein a flow rate of the fluid through the fluidic oscillator is indicated by the frequency of the alternating flow between the fluid paths.

24. The method of claim 15, wherein the frequency of the alternating flow between the fluid paths varies in response to changes in flow rate of the fluid through the fluidic oscillator.

25. The method of claim 15, wherein the frequency of the alternating flow between the fluid paths is detected at a location between the fluid paths.

26. The method of claim 18, wherein the sensor comprises an optical sensor.

27. The method of claim 18, wherein the sensor detects pressure pulses at twice the frequency of the flow alternating between the fluid paths.

28. The method of claim 18, wherein the sensor detects strain in a component of the fluidic oscillator.

29. A fluidic oscillator, comprising:
   at least one fluid switch;
   multiple fluid paths from the fluid switch to respective fluid outputs, whereby a majority of fluid which flows through the fluidic oscillator flows alternately via the fluid paths, the fluid paths crossing each other between the fluid switch and the respective fluid outputs; and
   a sensor which detects pressure fluctuations due to the flow alternating between the fluid paths.

30. The fluidic oscillator of claim 29, wherein the sensor is in communication with a chamber having an inlet positioned between two of the fluid paths.

31. The fluidic oscillator of claim 29, wherein a flow rate of the fluid through the fluidic oscillator is indicated by a frequency of the flow alternating between the fluid paths.

32. The fluidic oscillator of claim 29, wherein the fluid switch is at an intersection of the fluid paths with an input of the fluidic oscillator.

33. The fluidic oscillator of claim 29, wherein a frequency of the flow alternating between the fluid paths varies in response to changes in flow rate of the fluid through the fluidic oscillator.

34. The fluidic oscillator of claim 29, wherein the sensor senses pressure at a location between the fluid paths.

35. The fluidic oscillator of claim 29, wherein the sensor comprises an optical sensor.

36. The fluidic oscillator of claim 29, wherein the sensor measures pressure in a chamber which is directly impinged by flow from the fluid input.

37. The fluidic oscillator of claim 29, wherein the sensor detects the pressure fluctuations at twice the frequency of the flow alternating between the fluid paths.

38. The fluidic oscillator of claim 29, wherein the sensor comprises a strain sensor.

* * * * *